United States Patent
Immonen

(10) Patent No.: US 11,314,899 B2
(45) Date of Patent: Apr. 26, 2022

(54) METHOD AND SYSTEM FOR DETECTION OF TAMPERING IN EXECUTABLE CODE

(71) Applicant: Supercell Oy, Helsinki (FI)

(72) Inventor: Aki Immonen, Espoo (FI)

(73) Assignee: Supercell Oy, Helsinki (FI)

( * ) Notice: Subject to any disclaimer, the term of this patent is extended or adjusted under 35 U.S.C. 154(b) by 115 days.

(21) Appl. No.: 16/736,167

(22) Filed: Jan. 7, 2020

(65) Prior Publication Data

US 2021/0209255 A1 Jul. 8, 2021

(51) Int. Cl.
*G06F 21/12* (2013.01)
*G06F 21/64* (2013.01)
*G06F 21/52* (2013.01)
*G06F 21/57* (2013.01)

(52) U.S. Cl.
CPC .............. *G06F 21/64* (2013.01); *G06F 21/52* (2013.01); *G06F 21/57* (2013.01)

(58) Field of Classification Search
CPC .......... G06F 21/52; G06F 21/54; G06F 21/55; G06F 21/554; G06F 21/56; G06F 21/562; G06F 21/566; G06F 21/57; G06F 21/577; G06F 21/64; G06F 11/073; G06F 11/0793; G06F 11/36; G06F 11/3604; G06F 11/3608; G06F 11/3668
See application file for complete search history.

(56) References Cited

U.S. PATENT DOCUMENTS

| | | | | |
|---|---|---|---|---|
| 9,594,912 | B1* | 3/2017 | Thioux | G06F 21/566 |
| 2003/0188231 | A1 | 10/2003 | Cronce | |
| 2015/0095628 | A1 | 4/2015 | Yamada et al. | |
| 2015/0213260 | A1 | 7/2015 | Park | |
| 2015/0370560 | A1* | 12/2015 | Tan | G06F 9/30058 717/148 |
| 2016/0253497 | A1* | 9/2016 | Christodorescu | G06F 21/52 726/23 |
| 2017/0372067 | A1* | 12/2017 | Kim | G06F 21/563 |
| 2018/0039776 | A1 | 2/2018 | Loman et al. | |
| 2018/0349598 | A1* | 12/2018 | Harel | G06F 21/52 |
| 2019/0354678 | A1* | 11/2019 | Nayshtut | G06F 21/52 |

OTHER PUBLICATIONS

PCT Notification of Transmittal of The International Search Report and The Written Opinion of The International Searching Authority, or The Declaration, Application No. PCT/FI2020/050833, dated Mar. 15, 2021, 15 pages.

* cited by examiner

*Primary Examiner* — Olugbenga O Idowu
(74) *Attorney, Agent, or Firm* — Ziegler IP Law Group, LLC

(57) ABSTRACT

A method for detection of tampering in an executable code including one or more code blocks. The method includes monitoring execution of the executable code with a call stack data structure associated therewith, the execution involving accessing one or more address spaces; receiving information about the one or more address spaces, as accessed; comparing the received information about one or more accessed address spaces with information about one or more allowed address spaces defined in the call stack data structure of the executable code; raising a flag upon detection that the one or more accessed address spaces are different from the one or more allowed address spaces, based on the comparison; and executing an action based on the raised flag.

21 Claims, 4 Drawing Sheets

METHOD AND SYSTEM FOR DETECTION OF TAMPERING IN EXECUTABLE CODE

TECHNICAL FIELD

The present disclosure relates generally to preventing unauthorized modification of executable code; and more specifically, to a method for detection of tampering in executable codes. Moreover, the present disclosure also relates to a system for detection of tampering in executable codes. Furthermore, the present disclosure also relates to computer program products to perform the said method.

BACKGROUND

With developments in technology, several software programs have been developed for a variety of applications such as gaming, e-shopping, e-learning and the like. However, these software programs are often prone to unauthorized access resulting in alterations in the software program. In an example, multi-player video games are prone to attack by unauthorized users in a way that the unauthorized user tries to gain an advantage over other users by manipulating the software program by unauthorized access.

Moreover, the unauthorized users introduce malicious functions such as hooking functions inside the software programs. As a result, flow of execution of software program is redirected and thereby the software program follows instructions of the unauthorized users. Malicious functions are the functions of the software program which have been tampered by the unauthorized user. In an example, the malicious functions make the software program access libraries provided by the unauthorized user. In another example, the malicious functions enable the unauthorized user to manipulate a number of ammunitions with the unauthorized user in a video game.

The malicious functions provide an unfair advantage to the unauthorized users. Moreover, the malicious functions make the software program prone to data theft such that the malicious functions enable the unauthorized users to access and extract confidential data (such as data related to other users accessing the software program). Furthermore, unauthorized users sell cheat codes of the malicious functions to other users. Moreover, the unauthorized users also seek to get monetary benefits such as ransom by using the malicious functions. Furthermore, by introducing malicious functions in the software programs accessed by other users, the unauthorized users increase computational load on a processor employed by the other users for accessing the software programs. As a result, the processing speed of the processor is reduced and functions of the software programs are slowed. Moreover, the malicious functions also enable the unauthorized users to remotely control functioning of the software programs used by other users.

Conventionally, to overcome unauthorized access, pattern-matching techniques are used. Such pattern-matching techniques store known information related to specific patterns or sequences associated with malicious functions. The pattern-matching techniques identify malicious functions in the software program by identifying the patterns or sequences based on the known information. However, such techniques are ineffective as the malicious functions may involve a previously unknown pattern or may involve a marginal variation in the known pattern which makes the malicious function undetectable.

Therefore, in light of the foregoing discussion, there exists a need to overcome the aforementioned drawbacks associated with detection of malicious functions in the software programs.

SUMMARY

The present disclosure seeks to provide a method for detection of tampering in an executable code comprising one or more code blocks. The present disclosure also seeks to provide a system for detection of tampering in an executable code. The present disclosure further seeks to provide a computer program product to perform the said method. The present disclosure seeks to provide a solution to the existing problem of unauthorized users seeking advantage over other users by tampering the executable code. An aim of the present disclosure is to provide a solution that overcomes at least partially the problems encountered in prior art, and provides detection of tampering in the executable code which are even previously unknown and prevents any user of the executable code from seeking unfair advantages.

In an aspect, an embodiment of the present disclosure provides a method for detection of tampering in an executable code comprising one or more code blocks, comprising:
  monitoring execution of the executable code with a call stack data structure associated therewith, the execution involving accessing one or more address spaces;
  receiving information about the one or more address spaces, as accessed;
  comparing the received information about one or more accessed address spaces with information about one or more allowed address spaces defined in the call stack data structure of the executable code;
  raising a flag upon detection that the one or more accessed address spaces are different from the one or more allowed address spaces, based on the comparison; and
  executing an action based on the raised flag.

In another aspect, an embodiment of the present disclosure provides a system for detection of tampering in an executable code, comprising:
  a memory configured to store the executable code comprising one or more code blocks and a call stack data structure associated therewith, and a tamper detection code; and
  a processor configured to execute the tamper detection code to:
    monitor execution of the executable code, the execution involving accessing one or more address spaces;
    receive information about the one or more address spaces, as accessed;
    compare the received information about one or more accessed address spaces with information about one or more allowed address spaces defined in the call stack data structure of the executable code;
    raise a flag upon detection that the one or more accessed address spaces are different from the one or more allowed address spaces, based on the comparison; and
    execute an action based on the raised flag.

In yet another aspect, an embodiment of the present disclosure provides a computer program product, comprising computer-readable tamper detection code means which, when run in a computer, is arranged to cause the computer to perform the method for detection of tampering in an executable code comprising one or more code blocks.

In another aspect, an embodiment of the present disclosure provides a system for detection of tampering in an executable code, comprising:

a memory configured to store the executable code comprising one or more code blocks and a call stack data structure associated therewith, and a computer program product; and a processor configured to execute the tamper detection code.

Embodiments of the present disclosure substantially eliminate or at least partially address the aforementioned problems in the prior art, and enables detection of tampering in the executable code, taking action against unauthorized user performing tampering and preventing any user of the executable code from seeking unfair advantages.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
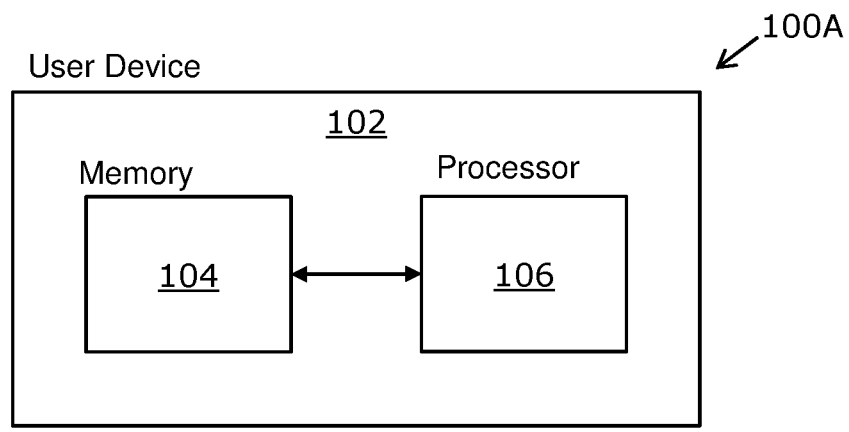
FIG. 1A is a block diagram of a system for detection of tampering in an executable code, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a method for detection of tampering in an executable code comprising one or more code blocks, comprising:

monitoring execution of the executable code with a call stack data structure associated therewith, the execution involving accessing one or more address spaces;

receiving information about the one or more address spaces, as accessed;

comparing the received information about one or more accessed address spaces with information about one or more allowed address spaces defined in the call stack data structure of the executable code;

raising a flag upon detection that the one or more accessed address spaces are different from the one or more allowed address spaces, based on the comparison; and executing an action based on the raised flag.

In another aspect, an embodiment of the present disclosure provides a system for detection of tampering in an executable code, comprising:

a memory configured to store the executable code comprising one or more code blocks and a call stack data structure associated therewith, and a tamper detection code; and a processor configured to execute the tamper detection code to:

monitor execution of the executable code, the execution involving accessing one or more address spaces;

receive information about the one or more address spaces, as accessed;

compare the received information about one or more accessed address spaces with information about one or more allowed address spaces defined in the call stack data structure of the executable code;

raise a flag upon detection that the one or more accessed address spaces are different from the one or more allowed address spaces, based on the comparison; and execute an action based on the raised flag.

In yet another aspect, an embodiment of the present disclosure provides a computer program product, comprising computer-readable tamper detection code means which, when run in a computer, is arranged to cause the computer to perform the method for detection of tampering in an executable code comprising one or more code blocks.

In another aspect, an embodiment of the present disclosure provides a system for detection of tampering in an executable code, comprising:

a memory configured to store the executable code comprising one or more code blocks and a call stack data structure associated therewith, and a computer program product; and a processor configured to execute the tamper detection code.

The present disclosure provides method and system which enable detection of tampering in the executable code, taking action against unauthorized user performing tampering and preventing any user from seeking unfair advantages. The method discussed herein is not dependent on previously known pattern for detection of tamper in the executable code and thereby is more accurate in detecting tampering in comparison to conventional techniques used for tamper detection. The method upon detection of tamper in the executable code is configured to terminate execution of the executable code in client device having the executable code. As a result, the unauthorized user does not get any unfair advantage over other users. Beneficially, the method is configured to check for tampering in the executable code only for one or more predetermined code blocks. As a result, the computing space and speed associated with tamper detection of executable code is reduced and user experience is enhanced. The method comprises employing read-only segments in the executable code which enhances detection of tampering in the executable code. The tamper detection code employed in the present disclosure is also tamper proof and unauthorized users cannot tamper the tamper detection code. In an example, tamper detection in the executable code of a combat strategy game enables in preventing any user to gain unfair advantages.

The present disclosure comprises the method and the system for detection of tampering in the executable code. Throughout the present disclosure, the term "executable code" herein refers to any collection or set of instructions/commands executable by a computer or other digital system so as to configure the computer or the digital system to perform one or more tasks that is the intent of the executable code. In other words, the executable code is a program or an application for a client device (i.e. a computer) such as a smartphone, a tablet. Additionally, the executable code is intended to encompass the aforesaid instructions stored in storage medium (discussed later in detail) such as RAM, a hard disk, optical disk, or so forth, and is also intended to encompass so-called "firmware" that is a software stored on a ROM or so forth. Optionally, the executable code may invoke system-level code or calls to other software residing on a server or other location to perform certain functions. Furthermore, the executable code may be pre-configured and pre-integrated with an operating system, building a software appliance. In an example, the executable code is a multiplayer game running on smartphone or tablet and connected to a game server. In another example, the executable code is configured to enable users to perform shopping and financial tasks, establish communication with other users, receive education from e-sources such as e-books and the like.

The executable code comprises one or more code blocks. The term "code block" as used herein refers to a module of the executable code that is configured to perform a specific task of one or more intended tasks of the executable code. Generally, the code block is configured to receive an input, process the input and return a result as an output based on the processing of the input. Each of the one or more code blocks is associated with an address space. In an example, in a combat strategy game, a first code block is configured to perform a task of moving an avatar of the game in a forward direction, a second code block is configured to perform a task of moving the avatar in a backward direction, a third code block is configured to perform a task of moving the avatar in a leftward direction and a fourth code block is configured to perform a task of moving the avatar in a rightward direction.

The term "tampering" used in the present disclosure refers to unauthorized access by unauthorized users resulting in modifications in the executable code. The unauthorized access enables addition of new and fraudulent codes to the executable code such that the executable code does not perform the intended task of the executable code. The unauthorized modifications are performed in the executable code in a way that the unauthorized users get a benefit over other users using the executable code. The unauthorized users perform function hooking in a way to tamper the execution of the executable code. Function hooks are implemented by modifying a small piece of code of the executable code, usually at the beginning of a code block, to redirect the execution flow of the executable code to a library provided by the unauthorized user. The present disclosure detects the tampering of the executable code to identify the unauthorized users performing the tampering, prevent the unauthorized users to perform such tampering in future, protect other users from the effects of tampering performed by unauthorized users, and thereby provide a safe and fair environment for all users accessing the executable code. In an example, in a combat strategy game, an unauthorized user may perform tampering of the executable code to increase an amount of ammunition with an avatar of the unauthorized user. In such a case, the unauthorized user gets a benefit over other users.

The system comprises the memory and the processor. The term "memory" as used herein refers to a volatile or persistent medium, such as an electrical circuit, magnetic disk, virtual memory or optical disk, in which data or software is stored for any duration. Optionally, the memory is non-volatile mass storage such as physical storage media. Optionally, the memory is connected to a server to receive the aforesaid data or software. The term "processor" as used herein refers to a computational element that is operable to respond to and processes instructions that drive the method. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the method. The memory and the processor are part of the client device.

The memory is configured to store the executable code comprising one or more code blocks and the call stack data structure associated therewith, and the tamper detection code. Optionally, the memory is configured to receive the executable code, the call stack data structure, and the tamper detection code from the server. The term "call stack data structure" as used herein refers to a data structure that is configured to store information related to a sequence of execution of the one or more code blocks. Optionally, the call stack data structure enables in determining a code block whose output is to be used as an input for the subsequent code block. Moreover, the call stack data structure further comprises the address space associated with each of the code blocks. In an example, the call stack data structure comprises a sequence of a first code block, a second code block and a third code block in a way that an output produced by the first code block is provided as an input to the third code block and further an output produced by the third code block is provided as input to the second code block. The term "tamper detection code" as used herein refers to a collection or a set of instructions that are configured to detect tampering performed by unauthorized users in the executable code by identifying variations in the address spaces associated with one or more code blocks. The tamper detection code is configured to perform runtime checking of the call stack data structure. The tamper detection code validates all address spaces associated with one or more code blocks. If all of the address spaces are within the executable code, then there is no tampering in the executable code as a tampered executable code has one or more address spaces directed to outside the executable code.

The tamper detection code is configured to monitor execution of the executable code, receive information about address spaces of the one or more code blocks, compare the received information about the accessed address spaces with information about the allowed address spaces, raise a flag upon detection that the accessed address spaces are different from the allowed address spaces, based on the comparison; and execute action based on the raised flag.

In an embodiment, the tamper detection code is added in line to the executable code. Optionally, the tamper detection code is added in line to the executable code before the one or more code blocks of the executable code. In an embodiment, the tamper detection code is a function called for execution of the executable code. In other words, the tamper detection code is separate from the executable code. The function associated with the tamper detection code is called to verify the address space associated with one or more code block. Optionally, the tamper detection code may be implemented at one or more positions in the executable code. In an embodiment, the tamper detection code is a stack pointer function. Optionally, the stack pointer function represents a top of the call stack data structure. Optionally, when a data is pushed into call stack data structure it is copied into the memory where the stack pointer function points to and the stack pointer function is incremented. However, when a data is popped from the call stack data structure, the stack pointer function is decremented but data stays in the call stack data structure and the data can be read until some other data is pushed to the call stack data structure.

The method comprises monitoring execution of the executable code with the call stack data structure associated therewith. Herein, the execution involves accessing one or more address spaces. The processor is configured to execute the tamper detection code to monitor execution of the executable code. The execution of the executable code comprises executing the one or more code blocks in a sequence or an order so that each of the one or more intended tasks of the executable code is achieved. The call stack data structure provides the sequence of execution of the one or more code blocks. Optionally, the method for monitoring execution of the executable code is iteratively performed for every pre-defined periods of time. In an example, an unauthorized user may tamper the one or more code blocks after the tamper detection code has monitored execution of the one or more code blocks. In such a case, iteratively monitoring the execution of the executable code enables in detecting tampering in the executable code. Optionally, the method for monitoring execution of the executable code is performed every time the user restarts software application the executable code is associated with. In an example, an unauthorized user may tamper the one or more code blocks after restarting the software when the tamper detection code has monitored execution of the one or more code blocks while running the software for the first time. In such a case, the method is able to detect tampering in the executable code even after restart of the software. In an example, the execution of the executable code is monitored in a multiplayer game to prevent hacking done by a player to gain advantage over other players. In another example, the execution of the executable code is monitored in a combat strategy game to prevent hacking done by a player to gain advantage over other players competing against the player.

In an embodiment, the method further comprises monitoring execution of each of the one or more code blocks of the executable code. Optionally, the each of the one or more code blocks are monitored as the one or more code blocks are executed based on their sequence of execution as in the call stack data structure. In an example, in the executable code of a combat strategy game, a sequence of execution of one or more code blocks includes a first code block for providing instruction to an avatar in the game to move forward, a second code block for providing instruction to the avatar to stop at an ammunition store, a third code block for providing instruction to the avatar to pick up an ammunition from the ammunition store and a fourth code block for providing instruction to the avatar to fire the ammunition. In such a case, the method is configured to monitor each of the first, second, third and fourth code block. In an embodiment, the processor is configured to execute the tamper detection code to monitor execution of each of the one or more code blocks of the executable code.

In an embodiment, the method further comprises monitoring execution of one or more predetermined code blocks of the executable code. Optionally, the memory is configured to receive information from the server about one or more predetermined code blocks which are rewarding code blocks that is such code blocks if tampered may provide benefits to the unauthorized user. The tamper detection code is added to such rewarding code blocks only. Optionally, the memory is configured to store information related to one or more predetermined code blocks having previous record for being tampered by other unauthorized users. Optionally, the memory receives the aforesaid information from the server at a time of receiving the executable code. The tamper detection code is added to such identified one or more code blocks only. In an example, in a combat strategy game, one or more predetermined code blocks may include a code block for a number of ammunition available with an avatar, a code block for an amount of virtual money associated with the avatar, a code block for a number of coins associated with the avatar and the like.

In an embodiment, the processor is configured to execute the tamper detection code to monitor execution of one or more predetermined code blocks of the executable code. As a result of monitoring execution of only the one or more predetermined code blocks, the processing speed of the processor is enhanced and time associated with detecting the tampering is reduced, thereby enhancing the overall user experience.

In an embodiment, the executable code is associated with a gaming application. In an example, the one or more predetermined code blocks of the executable code which are rewarding code blocks may be any one of listed in table 1.

TABLE 1

SetDeviceTokenMessage::encode
ModeBase::updateLoading
GameMain::showNativeDialog
HUD::setLeftSideVisible
LogicBattleLog::calculateAvailableResources
ServerConnection::update
LogicClientAvatar::decode
GameMain::IsIAPWarningNeeded
Building::getBuildingMovie
EventTracker::matchMakingSuccess
GameMode::~GameMode
Trap::update
HUDButton::goHomePressed In an embodiment, the method further comprises monitoring execution of initial one to three code blocks of the executable code. Optionally, monitoring execution of initial one to three code blocks of the executable code by the tamper detection code enables in determining if the executable code is tampered. In an embodiment, the processor is configured to execute the tamper detection code to monitor execution of initial one to three code blocks of the executable code. Beneficially, monitoring execution of only the initial one to three code blocks instead of all the code blocks enables in increasing the processing speed of the processor and time associated with determining tampering in the executable code. In an example, in a combat strategy game, initial one to three code blocks may include a code block for a number of ammunition available with an avatar, a code block for an amount of virtual money associated with the avatar, a code block for a number of lives associated with the avatar and the like. Such code blocks are generally at an initial position of the executable code when the software application is started by a user.

The method comprises receiving information about one or more address spaces, as accessed. In other words, the address space refers to indicators of the executable code in the client device. The term "address space" refers to an address pointing to authorized libraries of the executable code. The authorized libraries are used by the one or more code blocks to perform one or more tasks of the intended tasks of the executable code. Generally, upon tampering of the one or more code blocks, the one or more code blocks have an address space not pointing to the authorized library but to unauthorized library provided by the unauthorized user. The memory is configured to receive and store information related to one or more address spaces while receiving the one or more code blocks. The information about one or more address spaces is received from the call stack data structure. Optionally, the memory is also configured to receive the libraries that are pointed by the address space of the one or more code blocks. Generally, the unauthorized user inserts the unauthorized library to the memory of the client device and tampers the address space of the one or more code blocks to point to the unauthorized library. In an example, in a combat strategy game, an unauthorized user changes the address space of the code block associated with a number of ammunitions with the avatar. In such an example, the unauthorized user changes the address space of the code block to a library which increase the number of ammunitions with the avatar. Optionally, the memory receives the aforesaid information about one or more address spaces from the server at a time of receiving the executable code. The processor is configured to execute the tamper detection code to receive information about one or more address spaces, as accessed. In an example, in a combat strategy game, the tamper detection code is configured to receive information about one or more address spaces of one or more code blocks from the call stack data structure.

Optionally, the method further comprises receiving information about a size associated with each of the one or more code blocks such that the size corresponds to a computational size of the library each code block is associated with. Optionally, the size associated with each of the one or more code blocks is predetermined and stored. Moreover, the processor is configured to execute the tamper detection code to receive information about size associated with each of the one or more code blocks. Generally, upon tampering of the one or more code blocks, the size associated with each of the one or more code blocks is changed. In an example, in a combat strategy game, a size associated with a code block for an amount of money with the avatar, is changed from 10 kilobytes to 12 kilobytes. Optionally, the processor is configured to execute the tamper detection code to receive information about the size associated with each of the one or more code blocks.

The method comprises comparing the received information about one or more accessed address spaces with information about one or more allowed address spaces defined in the call stack data structure of the executable code. The term "allowed address space" refers to address space of a code block which is predetermined that is the address space is known by application developer(s) of the executable code and whose actual runtime location in the memory of the client device is defined by operating system of the client device while execution of the executable code. In other words, the term "allowed address space" refers to an address space pointing to authorized libraries of the executable code. Each of the one or more code blocks of an untampered executable code have the address space pointing to authorized libraries. Each of the authorized libraries have an address space in the memory and thereby one or more code blocks of untampered executable code have address space pointing to the authorized libraries. In an example, each of the one or more accessed address spaces and the one or more allowed address spaces are represented as an alpha-numeric string. In such an example, the alpha-numeric string of each of the one or more accessed address spaces may be compared with alpha-numeric string of each of one or more allowed address spaces to identify a variation in the one or more accessed address spaces. In such an example, each bit of the alpha-numeric string of each of the one or more accessed address spaces may be compared with each corresponding bit of the alpha-numeric string of each of one or more allowed address spaces to identify a variation in the one or more accessed address spaces based on variation in bits of the strings. The processor is configured to execute the tamper detection code to compare the received information about one or more accessed address spaces with information about one or more allowed address spaces defined in the call stack data structure of the executable code.

Optionally, the method comprises comparing the size associated with each of the one or more code blocks with an allowed size of the one or more code blocks. The term "allowed size" refers to the computational size of the library each untampered code block is associated with and whose computational size is known by the application developer(s) of the executable code. Optionally, the method comprises determining if the size associated with each of the one or more code blocks is equal to the allowed size of the one or more code blocks. The processor is configured to execute the tamper detection code to compare the size associated with each of the one or more code blocks with the allowed size of the one or more code blocks.

In an embodiment, the executable code contains at least one read-only segment containing information related to the one or more allowed address spaces thereof, and wherein the processor is configured to execute the tamper detection code to load the information related to the one or more allowed address spaces from the at least one read-only segment. Optionally, the at least one read-only segment also contains information about allowed size of one or more code blocks of the executable code and wherein the processor is configured to execute the tamper detection code to load the information related to the allowed size from the at least one read-only segment. Optionally, the at least one read-only segment is added to the executable code by the developer at the time of development of the executable code. Optionally, the at least one read-only segment is mapped directly from the executable code into the memory just once by for example a kernel. Optionally, upon the execution of the executable code the processor maps the at least one read-only segment into the memory. Optionally, the at least one read-only segment cannot be tampered by the unauthorized users. Optionally, the tamper detection code is configured to retrieve the size and starting address of the at least one read-only segment as the application program of the executable code starts to execute and further stores those address as safe addresses or allowed address spaces.

The method comprises raising the flag upon detection that the one or more accessed address spaces are different from the one or more allowed address spaces, based on the comparison. The term "flag" refers to a signal that is generated to indicate that a certain condition is determined at a position where the flag is generated. In the present disclosure, "flag" refers to the signal that is generated to indicate that the accessed address space associated with one or more code blocks is different from one or more allowed address space. Optionally, the flag may be a binary flag. Optionally, the flag may be a non-binary flag. Optionally, a flag may have true value or false value, wherein when the flag has the true value, it indicates that the given code block has an accessed address space different from the one or more allowed address space and when the flag has the false value, it indicates that the given code block has an accessed address space same as one of the one or more allowed address spaces. The processor is configured to execute the tamper detection code to raise the flag upon detection that the one or more accessed address spaces are different from the one or more allowed address spaces, based on the comparison. In an example, the identification of the value of the flags is performed every 10 seconds by the method.

In an embodiment, the method and system further comprises adding the flag as a global variable to the executable code. Optionally, the flag may be added as a global variable to each of the one or more code blocks of the executable code. Optionally, the flag of each of the one or more code blocks generally has a false value. Moreover, the value of the flag of a given code block is changed to a true value when the accessed address space of the given code block is different from the one or more allowed address spaces. Optionally, adding the flag as a global variable enables in using the value of the flag as an indicator to perform certain functions. In an example, if the value of the flag of a given code block is false, the accessed address space of one or more subsequent code blocks is not compared with the one or more allowed address space.

Optionally, the tamper detection code is configured to add context information such as a short code segment after the one or more code blocks having one or more accessed address spaces which are different from the one or more allowed address spaces. In an example, the context information provides information such as benefits the unauthorized user may seek by tampering the specific code block, effects of tampering of the specific code block on other users and the like.

The method comprises executing the action based on the raised flag. The method is configured to react to suspicious activity of tampering of the executable code by executing the action to prevent the unauthorized user to seek any benefits from tampering the executable code and further protect other users from losses due to tampering of the executable code. The processor is configured to execute the tamper detection code to execute the action based on the raised flag. In an embodiment, the method further comprises terminating execution of the executable code upon raising the flag. Moreover, upon the termination of execution of the executable code the unauthorized user is not able to use the application program having the executable code. Optionally, the termination of execution of the executable code is useful for immediate blocking of the unauthorized user from using the application program having the executable code. Optionally, the developer of the executable code may be unaware about the tampering of the executable code and subsequent blocking of the unauthorized user. The processor is configured to execute the tamper detection code to terminate execution of the executable code upon raising the flag.

In an embodiment, the method further comprises transmitting to a server arrangement, upon raising the flag, information related to one or more of: one or more programs modifying the address spaces being accessed for execution of the executable code; information related to an Internet Protocol (I.P.) address of a user device employing the executable code; and information about a user profile associated the user device. The term "server arrangement" refers to a structure and/or module that include programmable and/or non-programmable components configured to store, process and/or share information. Specifically, the server arrangement is configured to provide the executable code to the user device and receive the aforesaid information from the user device upon raising the flag. Optionally, the server arrangement includes any arrangement of physical or virtual computational entities capable of enhancing information to perform various computational tasks. In an example, the server arrangement may include components such as memory, a processor, a network adapter and the like. It will be appreciated that the terms server arrangement and server are interchangeably used in the present disclosure. Optionally, the information reveals details about the tampering attempt performed by the unauthorized user. Optionally, the one or more programs modifying the address spaces may be added to the executable code by the unauthorized user. Optionally, the one or more programs modifying the address spaces may be external to the executable code. Beneficially, the information about one or more programs modifying the address spaces enables in immediate termination of executable code upon detection of such one or more programs. Optionally, the information may also include a Global Positing System (G.P.S.) location and an International Mobile Equipment Identity (I.M.E.I.) of the user device. It will be appreciated that the terms user device and client device have been used interchangeably in the present disclosure. Optionally, the information about the user profile includes but is not limited to user name, user identification number, user profile picture, user's nationality, user's residential address, user's age, user's contact number, user's email address and the like. Optionally, the information may also include details about any previous tampering attempts by the user. Optionally, the information about the user profile is pre-stored in the gaming application. Beneficially, such information enables in identifying unauthorized users which have repeatedly been performing tampering of the executable code. Moreover, such unauthorized users may be permanently banned from using the executable code. In an embodiment, the processor is configured to transmit the aforesaid information to the server arrangement. Optionally, the method, upon raising the flag, is configured to correct the one or more accessed address spaces different from the one or more allowed address spaces.

In an embodiment, the method further comprises implementing a checksum function to prevent tampering of the tamper detection code. The term "checksum function" refers to a function which when executed on the tamper detection code results in a first output. Optionally, the first output is known by the developer of the application program having the executable code. More optionally, the first output may be added to the executable code by the developer. The checksum function is again executed on the tamper detection code at the time of execution of the executable code on the client device to generate the second output. Optionally, the second output may be added to the executable code. Optionally, the executable code is configured to compare the first output with the second output. Moreover, based on the comparison, if the first output and the second output are different, a flag may be raised and further execution of the executable code may be terminated. In an embodiment, the processor is configured to implement the checksum function to prevent tampering of the tamper detection code.

In an exemplary implementation of a gaming application, the gaming application comprises function1, function2, function3 and function4. In such a case, execution of untampered executable code of the gaming application comprises function1 calling the function2 and the function2 upon execution returning a value to function1. However, upon tampering of the executable code, the execution of tampered executable code comprises function1 calling the function3 and further fuction3 may be calling function4 and function2. In such a case, the return address space in function3 is found to be tampered by the tamper detection code. Moreover, a flag is raise and an action is executed by the tamper detection code.

The present disclosure further provides a computer program product comprising computer-readable tamper detection code means which, when run in a computer, is arranged to cause the computer to perform the method for detection of tampering in the executable code comprising one or more code blocks. The computer program product causes the computer to monitor execution of the executable code, receive information about one or more address spaces, compare the received information about one or more accessed address spaces with information about one or more allowed address spaces, raise flag upon detection that the one or more accessed address spaces are different from the one or more allowed address spaces, and execute action based on the raised flag. Optionally, the computer program product is stored on a non-transitory storage medium.

The present disclosure further provides a system for detection of tampering in an executable code. The system comprises a memory configured to store the executable code comprising one or more code blocks and a call stack data structure associated therewith, and the aforementioned computer program product; and a processor configured to execute the tamper detection code. The processor is configured to monitor execution of the executable code, receive information about one or more address spaces, compare the received information about one or more accessed address spaces with information about one or more allowed address spaces, raise flag upon detection that the one or more accessed address spaces are different from the one or more allowed address spaces, and execute action based on the raised flag.

DETAILED DESCRIPTION OF THE DRAWINGS

Referring to FIG. 1A, there is shown a system 100A for detection of tampering in an executable code, in accordance with an embodiment of the present disclosure. As shown, the system 100A comprises a user device 102. The user device 102 comprises a memory 104 and a processor 106. The memory 104 is configured to store the executable code comprising one or more code blocks and a call stack data structure associated therewith, and a tamper detection code. The processor 106 is configured to execute the tamper detection code.

Figure 1B:
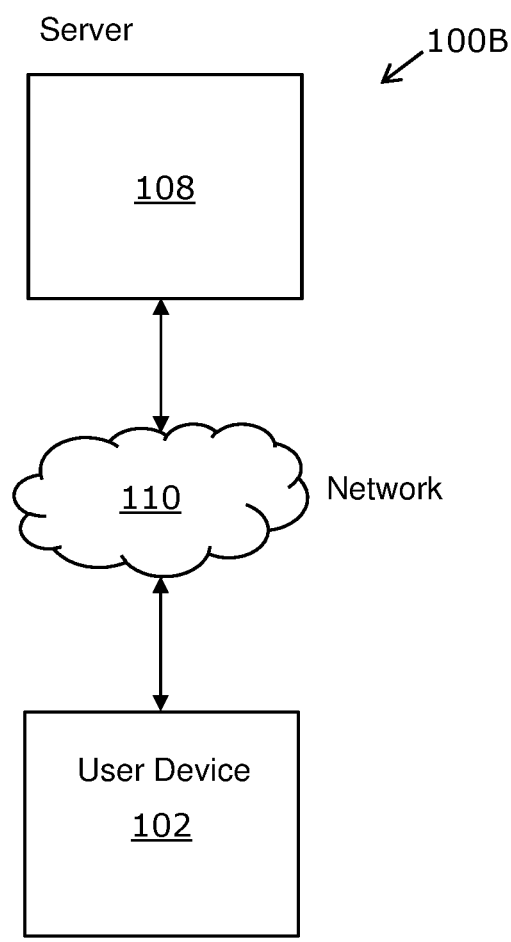
FIG. 1B is a network environment of the system of FIG. 1A, in accordance with an embodiment of the present disclosure.

Referring to FIG. 1B, there is shown a network environment of a system 100B for detection of tampering in an executable code, in accordance with an embodiment of the present disclosure. The system 100B comprises the user device 102 communicatively coupled to a server arrangement 108 via a network 110. The user device 102 is configured to receive from the server arrangement 108, the executable code comprising one or more code blocks and a call stack data structure associated therewith, and a tamper detection code.

Figure 1C:
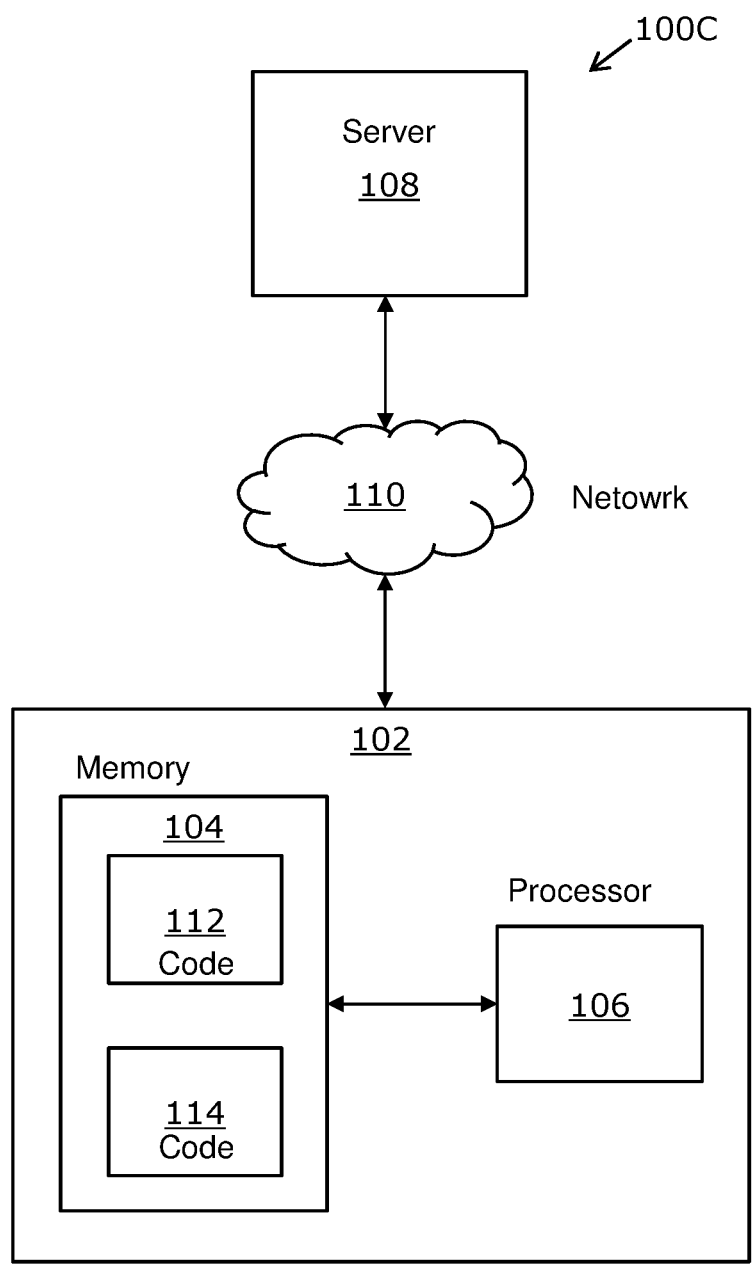
FIG. 1C is a network environment of the system of FIG. 1A, in accordance with another embodiment of the present disclosure.

Referring to FIG. 1C, there is shown a network environment of a system 100C for detection of tampering in an executable code 112, in accordance with another embodiment of the present disclosure. The system 100C comprises the user device 102 communicatively coupled to the server arrangement 108 via the network 110. The memory 104 of the user device 102 is configured to receive from the server arrangement 108, the executable code 112 and a tamper detection code 114. The processor 106 of the user device 102 is configured to transmit to the server arrangement 108, upon raising a flag, information related to one or more of: one or more programs modifying address spaces being accessed for execution of the executable code 112; information related to an Internet Protocol (I.P.) address of the user device 102 employing the executable code 112; and information about a user profile associated the user device 102.

Figure 2:
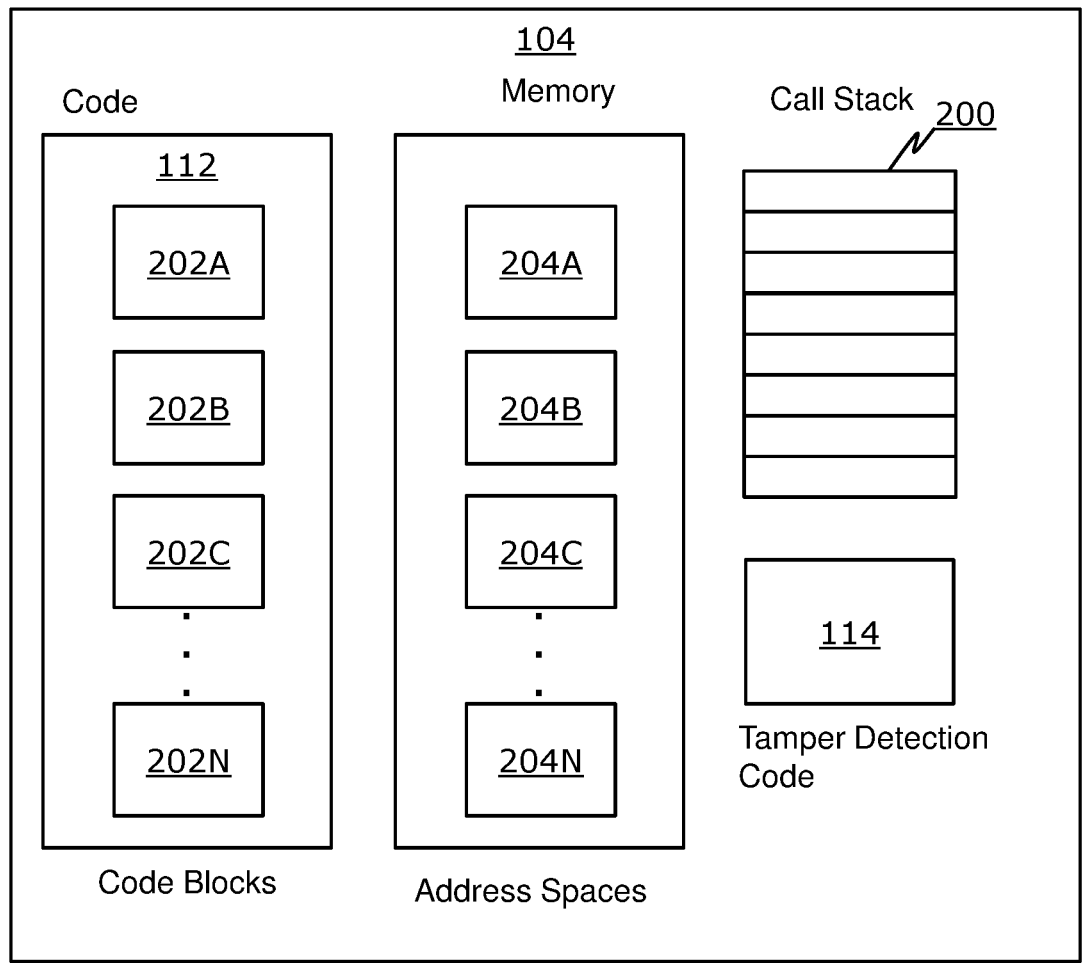
FIG. 2 is a block diagram depicting details of a memory of the system of FIG. 1A, in accordance with an embodiment of the present disclosure.

Referring to FIG. 2, there is shown a block diagram depicting details of the memory 104 of the system for detection of tampering in the executable code 112, in accordance with an embodiment of the present disclosure. As shown, the memory 104 comprises the executable code 112, a call stack data structure 200 and the tamper detection code 114. The executable code 112 comprises one or more code blocks depicted as code blocks 202A, 202B, 202C to 202N. The memory 104 comprises one or more address spaces depicted as address spaces 204A, 204B, 204C to 204N accessed by one or more code blocks 202A, 202B, 202C to 202N for the execution of the executable code 112.

Figure 3:
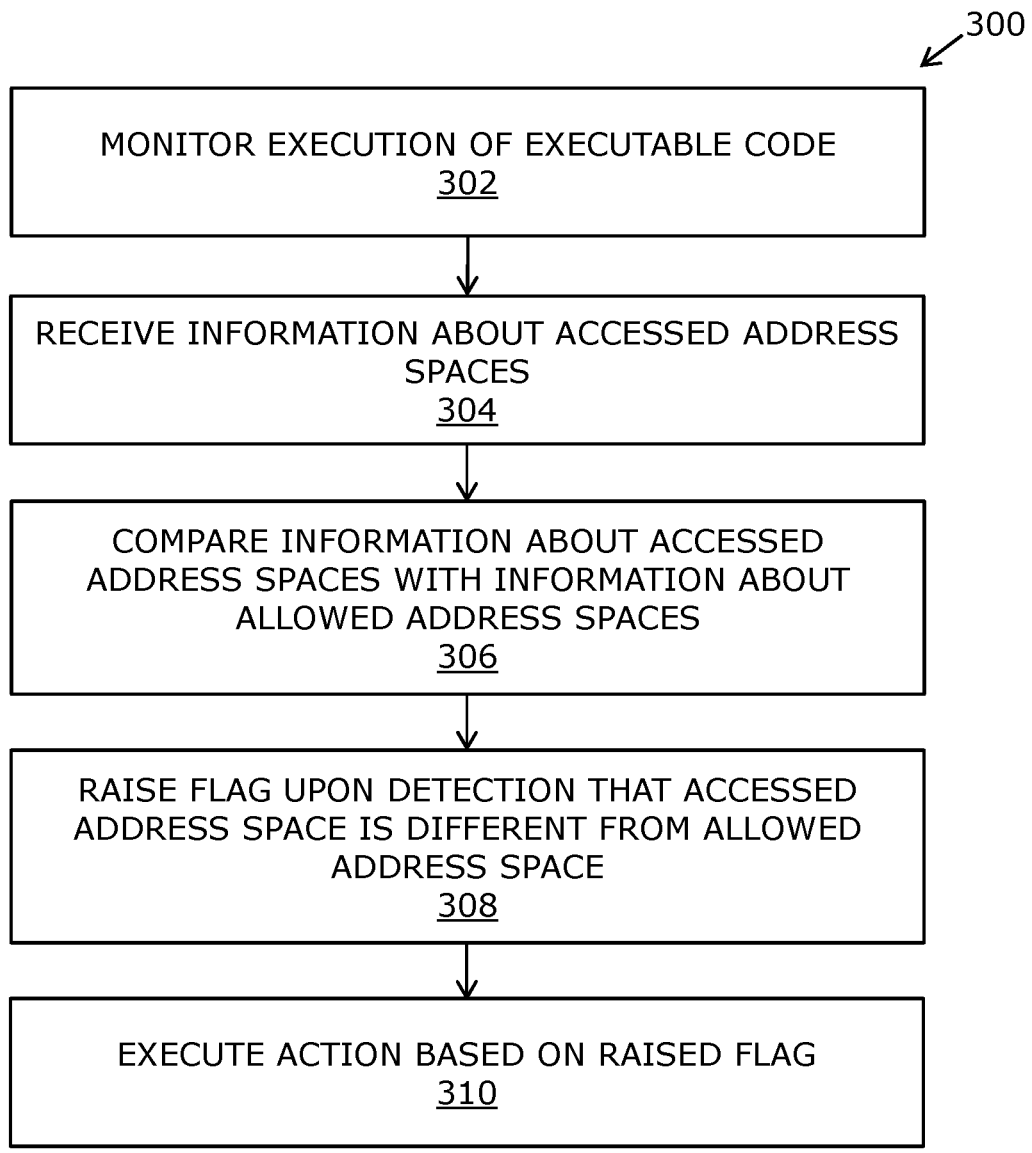
FIG. 3 is a flowchart of a method for detection of tampering in an executable code, in accordance with an embodiment of the present disclosure.

Referring to FIG. 3, there is shown a flowchart of a method 300 for detection of tampering in an executable code comprising one or more code blocks, in accordance with an embodiment of the present disclosure. At a step 302, the execution of the executable code with a call stack data structure associated therewith is monitored. Herein the execution involves accessing one or more address spaces. At a step 304, information about the one or more address spaces, as accessed, is received. At a step 306, the received information about one or more accessed address spaces is compared with information about one or more allowed address spaces defined in the call stack data structure of the executable code. At a step 308, a flag is raised upon detection that the one or more accessed address spaces are different from the one or more allowed address spaces, based on the comparison. At a step 310, an action is executed based on the raised flag.

The steps 302 to 310 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for detection of tampering in an executable code, the executable code comprising a gaming application and one or more code blocks, the method comprising:
monitoring execution of the executable code with a call stack data structure associated therewith, the execution involving accessing one or more address spaces, wherein each address space in the one or more address spaces comprises a rewarding code block;
receiving information about the one or more address spaces, as accessed;
comparing the received information about the one or more accessed address spaces with information about one or more allowed address spaces defined in the call stack data structure of the executable code;
raising a flag upon detection that the received information about the one or more accessed address spaces are different from the information about the one or more allowed address spaces, based on the comparison; and
executing an action based on the raised flag;
wherein the received information about the one or more address spaces comprises a record of previous tampering by unauthorized users of code blocks associated with the one or more address spaces.

2. The method of claim 1 further comprising monitoring execution of each of the one or more code blocks of the executable code.

3. The method of claim 1 further comprising monitoring execution of one or more predetermined code blocks of the executable code.

4. The method of claim 1 further comprising monitoring execution of only an initial one to three code blocks of the executable code and not monitoring any additional code blocks of executable code.

5. The method of claim 1 further comprising terminating execution of the executable code upon raising the flag.

6. The method of claim 1 further comprising transmitting to a server arrangement, upon raising the flag, information revealing details about the tampering attempt performed by the unauthorized user.

7. The method of claim 1 further comprising adding one or more of the flag as a global variable, and a context information, to the executable code, wherein the context information comprises one or more of benefits the unauthorized users may seek by tampering a specific code block, and effects on other users resulting from tampering of the specific code block.

8. A system for detection of tampering in an executable code, the system comprising:
a memory configured to store the executable code, wherein the executable code comprises a gaming application, one or more code blocks, a call stack data structure associated therewith, and a tamper detection code; and
a processor configured to execute the tamper detection code, wherein execution of the tamper detection code causes the processor to:
monitor execution of the executable code, the execution involving accessing one or more address spaces, wherein each address space in the one or more address spaces comprises a rewarding code block;
receive information about the one or more address spaces, as accessed;
compare the received information about the one or more accessed address spaces with information about a one or more allowed address spaces defined in the call stack data structure of the executable code;
raise a flag upon detection that the received information about the one or more accessed address spaces are different from the information about the one or more allowed address spaces, based on the comparison; and
execute an action based on the raised flag.

9. The system of claim 8, wherein the processor is configured to execute the tamper detection code to monitor execution of each of the one or more code blocks of the executable code.

10. The system of claim 8, wherein the processor is configured to execute the tamper detection code to monitor execution of one or more predetermined code blocks of the executable code.

11. The system of claim 8, wherein the processor is configured to execute the tamper detection code to monitor execution of only an initial one to three code blocks of the executable code, and not monitoring any additional code blocks of the executable code.

12. The system of claim 8, wherein the processor is configured to execute the tamper detection code to terminate execution of the executable code upon raising the flag.

13. The system of claim 8, wherein the processor is configured to transmit to a server arrangement, upon raising the flag, information revealing details about the tampering attempt by the unauthorized user.

14. The system of claim 8, wherein the executable code comprises at least one read-only segment containing information related to the one or more allowed address spaces thereof, and wherein the processor is configured to execute the tamper detection code to load the information related to the one or more allowed address spaces from the at least one read-only segment.

15. The system of claim 8, wherein the tamper detection code is added in line to the executable code.

16. The system of claim 8, wherein the tamper detection code is a function called for execution of the executable code.

17. The system of claim 8, wherein the tamper detection code is a stack pointer function.

18. The system of claim 8, wherein the processor is configured to implement a checksum function to prevent tampering of the tamper detection code.

19. The system of claim 8, wherein the processor is configured to add one or more of the flag as a global variable, and a context information to the executable code, wherein the context information comprises one or more of benefits the unauthorized users may seek by tampering a specific code block, and effects on other users resulting from tampering of the specific code block.

20. A computer program product, stored on a non-transitory computer readable medium comprising computer-readable tamper detection code means which, when run in a computer, is arranged to cause the computer to perform the method according to claim 1.

21. A system for detection of tampering in an executable code, comprising:
a memory configured to store the executable code comprising one or more code blocks and a call stack data structure associated therewith, and a computer program product as claimed in claim 20; and a processor configured to execute the tamper detection code.

\* \* \* \* \*